(12) United States Patent
Bui et al.

(10) Patent No.: US 11,354,720 B2
(45) Date of Patent: Jun. 7, 2022

(54) ITEM RECOMMENDATION TECHNIQUES

(71) Applicant: Adobe Inc., San Jose, CA (US)

(72) Inventors: Hung Bui, Sunnyvale, CA (US); Branislav Kveton, San Jose, CA (US); Suvash Sedhain, Acton (AU); Nikolaos Vlassis, San Jose, CA (US); Jaya Kawale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 74 days.

(21) Appl. No.: 16/847,156

(22) Filed: Apr. 13, 2020

(65) Prior Publication Data
US 2020/0242678 A1 Jul. 30, 2020

Related U.S. Application Data

(62) Division of application No. 15/264,068, filed on Sep. 13, 2016, now Pat. No. 10,657,574.

(51) Int. Cl.
*G06Q 30/06* (2012.01)
*G06F 7/08* (2006.01)

(52) U.S. Cl.
CPC .......... *G06Q 30/0631* (2013.01); *G06F 7/08* (2013.01)

(58) Field of Classification Search
None
See application file for complete search history.

(56) References Cited

U.S. PATENT DOCUMENTS

| | | | |
|---|---|---|---|
| 6,278,799 B1 | 8/2001 | Hoffman | |
| 8,131,732 B2* | 3/2012 | Yu | G06F 16/9535 707/748 |
| 8,775,428 B2 | 7/2014 | Birdwell et al. | |
| 9,691,035 B1* | 6/2017 | Sandler | G06Q 30/0631 |
| 9,754,266 B2* | 9/2017 | Zhang | G06Q 30/0244 |
| 10,063,406 B2* | 8/2018 | Tapia | G06N 20/00 |
| 10,970,400 B2* | 4/2021 | Roytman | G06N 7/005 |
| 11,093,846 B2* | 8/2021 | Obara | G06F 17/16 |
| 2007/0094067 A1* | 4/2007 | Kumar | G06Q 10/04 705/26.2 |
| 2010/0100543 A1* | 4/2010 | Brady | G06F 16/31 707/732 |
| 2012/0041769 A1* | 2/2012 | Dalal | G06Q 10/101 705/1.1 |
| 2013/0151543 A1 | 6/2013 | Fan et al. | |
| 2013/0226839 A1* | 8/2013 | Archambeau | G06N 20/00 706/12 |
| 2014/0236943 A1* | 8/2014 | Li | G06F 16/2457 707/736 |

(Continued)

OTHER PUBLICATIONS

U.S. Appl. No. 15/264,068, filed Sep. 13, 2016, Allowed.

(Continued)

*Primary Examiner* — Fateh M Obaid

(74) *Attorney, Agent, or Firm* — F. Chau & Associates, LLC

(57) ABSTRACT

Techniques disclosed herein provide more efficient and more relevant item recommendations to users in large-scale environments in which only positive interest information is known. The techniques use a rank-constrained formulation that generalizes relationships based on known user interests in items and/or use a randomized singular value decomposition (SVD) approximation technique to solve the formulation to identify items of interest to users in an efficiently, scalable manner.

20 Claims, 6 Drawing Sheets

(56) References Cited

U.S. PATENT DOCUMENTS

| | | | |
|---|---|---|---|
| 2015/0019325 A1* | 1/2015 | Li | G06Q 30/0271 |
| | | | 705/14.42 |
| 2015/0193548 A1* | 7/2015 | Nice | G06F 16/25 |
| | | | 707/748 |
| 2015/0278908 A1* | 10/2015 | Nice | G06Q 30/0631 |
| | | | 705/26.7 |
| 2017/0031920 A1 | 2/2017 | Manning et al. | |

OTHER PUBLICATIONS

Greg Linden, Brent Smith, and Jeremy York. Amazon. com recommendations: Item-to-item collaborative filtering. Internet Computing, IEEE, 7(1):76-80, 2003.

Yifan Hu, Yehuda Koren, and Chris Volinsky. Collaborative filtering for implicit feedback datasets. In ICDM '08, pp. 263-272, Washington, DC, USA, 2008. IEEE Computer Society.

X. Ning and G. Karypis. SLIM: Sparse linear methods for top-n recommender systems. In IEEE International Conference on Data Mining (ICDM). IEEE, 2011.

Suvash Sedhain, Aditya Menon, Scott Sanner, and Darius Braziunas. On the effectiveness of linear models for one-class collaborative filtering. Proceedings of the 30th Conference on Arlilicial Intelligence (AAAI-16), 2016.

Rong Pan, Yunhong Zhou, Bin Cao, Nathan N. Liu, Rajan Lukose, Martin Scholz, and Qiang Yang. One-class collaborative filtering. In IEEE International Conference on Data Mining (ICDM), pp. 502-511, Washington, DC, USA, 2008. IEEE Computer Society.

Yehuda Koren. Factorization meets the neighborhood: A multifaceted collaborative filtering model. In KDD '08, pp. 426-434, New York, NY, USA, 2008. ACM.

Nathan Halko, Per-Gunnar Martinsson, and Joel A Tropp. Finding structure with randomness: Probabilistic algorithms for constructing approximate matrix decompositions. SIAM review, 53(2):217-288, 2011.

* cited by examiner

30 ⭠

31
Generate a recommendation matrix comprising values identifying individual items in which individual users have demonstrated positive interest

32
Determine a formulation for a similarity matrix that represent relationships in the recommendation matrix, where the formulation is subject to a rank constraint and a Frobenius norm constraint

33
Represent the similarity matrix as a combination of two smaller matrices

34
Determine values for the first smaller matrix by enforcing the rank constraint without enforcing the Frobenius norm constraint

35
Use the values for the first smaller matrix to determine values for the second smaller matrix using a formulation that applies the Frobenius norm constraint

36
Determine the similarity matrix by combining the two smaller matrices

FIGURE 3

ITEM RECOMMENDATION TECHNIQUES

CROSS-REFERENCE TO RELATED APPLICATION

This application is a divisional application and claims the benefit of U.S. application Ser. No. 15/264,068, filed on Sep. 13, 2016 and titled "ITEM RECOMMENDATION TECHNIQUES", which is incorporated herein by reference in its entirety.

TECHNICAL FIELD

This disclosure relates generally to computer-implemented methods and systems and more particularly relates to improving the efficiency and effectiveness of computing methods and systems that analyze data and provide recommendations based on information about user interest in items.

BACKGROUND

Various techniques are used to identify items (e.g., products, music, movies, hotel rooms, flights, etc.) to recommend to a user in which the user is likely to be most interested. For example, a product sales website will present a few recommended products for a user shopping on the website. Some techniques provide general recommendations applicable to all users, for example, identifying the website's top 5 current products based on purchases made by all users. However, such general recommendations do a poor job of identifying the individual users' interests. Thus, various techniques attempt to identify items that are better tailored to a user based on information about the user and other users. Specifically, collaborative filtering techniques (also known as social filtering techniques) use the assumption that users who were previously interested in the same items are likely to have similar interests on other items.

Existing collaborative filtering techniques that attempt to identify items to recommend to users are unable to provide adequate recommendations in large scale, one class (i.e., positive interest feedback only) environments. Positive interest feedback environments are common in Internet and other network-based applications. For example, many websites offer products for sale and collect information about millions of users purchasing millions of products. The providers of such websites can identify positive interest of users in items based on the purchases that the users make, but cannot similarly identify that users have negative interest in items based on the users not having purchased the items. As a specific example, when a user views a product information web page about a book for sale and then purchases the book, it is known that the user has a positive interest in the book. However, if the user views the product information web page about the book and does not purchase the book or never views the product information web page about the book, it does not necessarily mean that the user has a negative opinion of the book. Existing collaborative filtering techniques are unable to make recommendations in these environments with sufficient relevancy and efficiency.

SUMMARY

The invention provides techniques for identifying interest items (i.e., items expected to be of interest) for a user based on positive interest information of many users and many items. The techniques determine a similarity matrix that quantifies similarities between items or similarities between users and then uses the similarity matrix to identify the interest items for a user. Certain techniques of the invention use a rank constraint in determining values of a similarity matrix to provide interest item results more efficiently and accurately than prior techniques. Techniques of the invention identify positive interest information that identifies individual items in which individual users have demonstrated positive interest. For example, the techniques can identify which users have purchased, "liked," and/or searched for which items. The techniques use this positive interest information to determine values of a similarity matrix using a rank constraint. This involves determining a model of the similarity matrix that models the similarity matrix as a product of a first matrix and a second matrix. The rank constraint is applied in the model to restrict the dimensions of the first matrix and the second matrix. Using the rank constraint to restrict the dimensions of the first matrix and second matrix ensures that these matrices will compactly capture general relationships between many items and many users. Restricting the dimensions also makes determining values of these matrices more efficient. After determining the model and applying the rank constraint, the techniques determine values of the first matrix and second matrix based on the positive interest information. The values of the first matrix and second matrix values are then used to determine values of the similarity matrix. Once the values of the similarity matrix are determined, the values can be used to identify interest items for the user.

Certain techniques of the invention first generate a recommendation matrix of values identifying individual items in which individual users have demonstrated positive interest. For example, the recommendation matrix can initially identify which users have already purchased, "liked," and/or searched for which items. As a specific example, a "1" value in the recommendation matrix can identify that a user U1 had expressed positive interest in book B1, etc. Thus, initially the recommendation matrix includes only known positive interest of users in items. Techniques of the invention use the recommendation matrix to determine values for the similarity matrix and then use the similarity matrix to determine additional values for the recommendation matrix. These additional values are interest values that quantify predictions of how interested users will be in other items. For example, even though user U1 has never expressed positive interest in book B2, an interest value of 0.8 is determined as a prediction of how much user U1 will be interested in book B2. Multiple items for the user are compared and the items having the top interest values are selected as the interest items for the user.

Certain techniques of the invention additionally or alternatively use a randomized single value decomposition (SVD) technique to determine values of a similarity matrix. Techniques of the invention determine values of a similarity matrix by determining a model of the similarity matrix that models the similarity matrix as a product of a first matrix and a second matrix. Values for the first matrix and/or second matrix are determined based on the positive interest data in an initial recommendation matrix. Such values can be directly determined using an SVD technique. An SVD technique is a mathematical technique that factorizes a matrix into several factors to allow values of the matrix to be determined. The factors determined by applying an SVD technique on the recommendation matrix provide the values for the first matrix and/or second matrix in the similarity matrix model. However, in large scale environments involving millions of users and millions of items, directly computing an SVD of a recommendation matrix is computationally infeasible. A randomized SVD technique is used to make the computation feasible in these large scale environments. The randomized SVD technique compresses the recommendation matrix using a random matrix to determine a compressed matrix representing the recommendation matrix. An SVD technique is then applied to the compressed matrix to determine values for the first matrix or values for the second matrix in the similarity matrix model. The values for the first matrix and second matrix are used to determine the values of the similarity matrix. The values of similarity of the similarity matrix are then used to determine interest values of the recommendation matrix representing user interest in items. These interest values for multiple items for a particular user are assessed and interest items for the user are identified.

These illustrative features are mentioned not to limit or define the disclosure, but to introduce exemplary features to aid understanding thereof. Additional techniques are discussed in the Detailed Description, and further description is provided there.

BRIEF DESCRIPTION OF THE FIGURES

These and other features, techniques, and advantages of the present disclosure are better understood when the following Detailed Description is read with reference to the accompanying drawings.

FIG. 3 is a flow chart illustrating an exemplary technique for determining a similarity matrix representing relationships in positive interest data of a recommendation matrix based on a rank constraint and a Frobenius norm constraint.

DETAILED DESCRIPTION

Introduction

Figure 1:
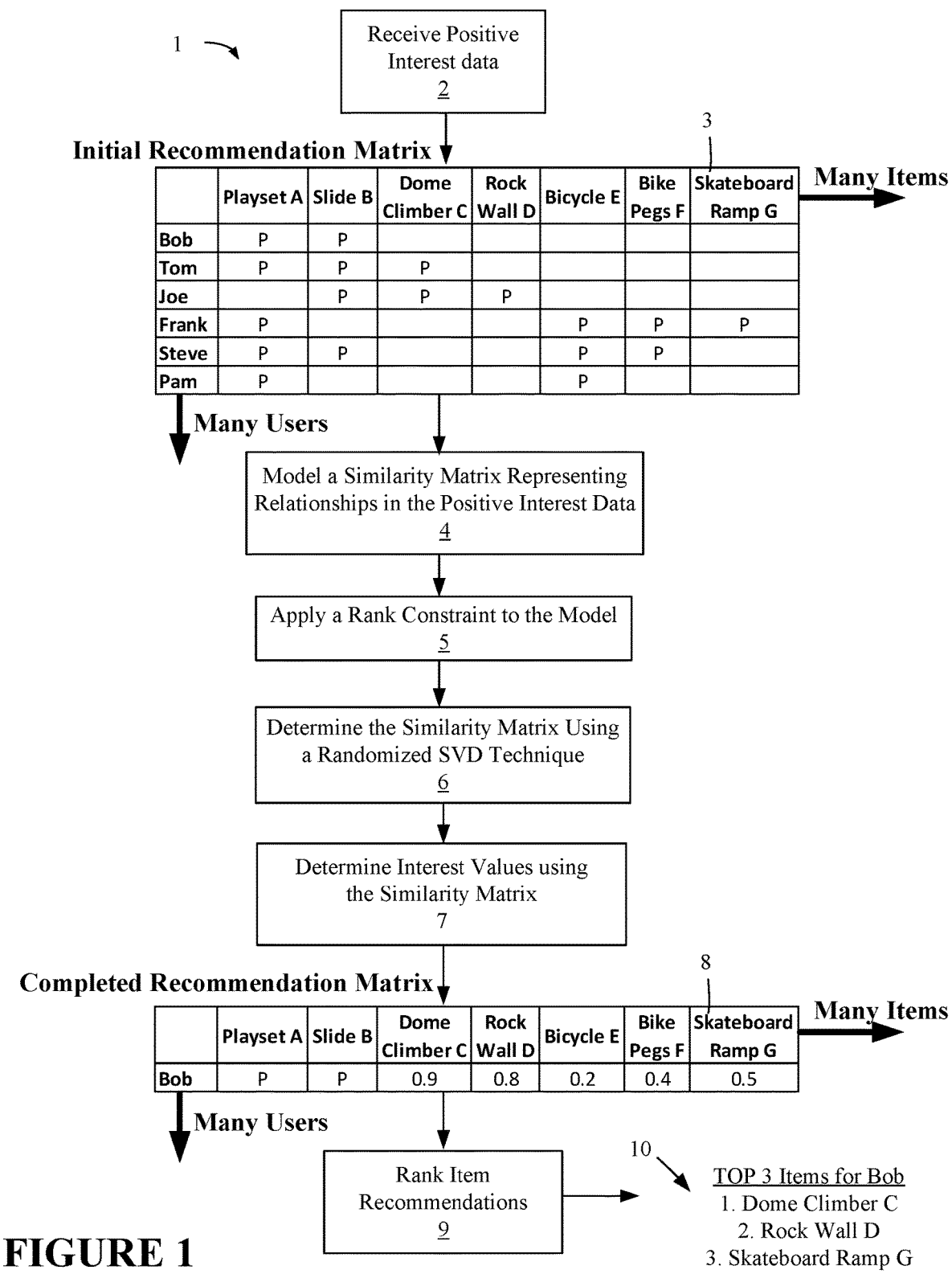
FIG. 1 is a block diagram illustrating an exemplary technique for identifying items expected to be of interest to a user.

As discussed above, in large-scale environments in which only positive interest is known, existing collaborative filtering techniques are unable to provide recommendations with sufficient relevancy and efficiency. Techniques disclosed herein provide more efficient and more relevant item recommendations to users in large-scale environments in which only positive interest is known. The techniques use a rank-constrained formulation that generalizes relationships between items and users based on known user interests in items. The specific relationships between users and items that are known (e.g., that user A purchased book 1, that user A purchased book 2, that user B purchased Book 1, that user B purchased book 2, etc.) are used to determine more general relationships (e.g., that both book 1 and book 2 have been purchased by many of the same users). These general relationships are used to quantify similarities (e.g., identifying a 0.8 score for the similarity between book 1 and book 2). Techniques of the invention attempt to find a similarity matrix to quantify the similarity of each item to each other item or the similarity of each user to each other user. To determine the similarity matrix, the techniques of the invention use a formulation that uses a rank constraint that limits how the similarity matrix is determined to ensure that the similarity matrix represents generalized relationships from the positive interest data. Specifically, the similarity matrix is determined as the product of two smaller matrices that can be determined from the specific relationships in the positive interest data. The rank constraint requires that these smaller matrices be relatively small, which means that these smaller matrices must compress (and thus generalize) the relationships identified from positive interest data. Using the rank constraint ensures that the similarity matrix will represent generalized relationships and can thus be used to make predictions of items in which users are likely to be interested.

The techniques additionally or alternatively use a randomized SVD technique to make computing the similarity matrix computationally feasible. A randomized SVD technique is used to determine at least one of the smaller matrices that are used to determine the similarity matrix. An SVD technique is a mathematical technique that factorizes a matrix into several factors to allow values of the matrix to be determined. Applying an SVD technique to the recommendation matrix would produce a factor that could be used as one of the smaller matrices in the similarity matrix determination. However, directly using an SVD technique on a recommendation matrix in large scale environments involving millions of users and millions of items is computationally infeasible. Accordingly, an SVD is instead applied on a smaller approximation of the recommendation matrix that is determined using randomization. This randomized SVD technique can be used to efficiently compute the factor, which is then used as one of the smaller matrices used to produce the similarity matrix. This makes the technique feasible for large scale environments involving millions of users and millions of items, while still ensuring high-quality recommendations The techniques disclosed herein enable recommendations that outperform existing nearest neighbor-based techniques in terms of providing relevant recommendations. The techniques disclosed herein also outperform existing linear-based techniques in terms of computational efficiency. The techniques also provide numerous other advantages over existing techniques.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, televisions, television set top devices, desktop computers, laptop computers, server computers, tablets, telephones, mobile telephones, portable data assistant (PDA), e-readers, smart watches, and other devices with processing capabilities that provide content for display on televisions, projectors and other displays.

As used herein, the phrase "positive interest" refers to a user liking, wanting, or otherwise having a favorable sentiment or feeling for an item. The positive interest of a user in an item is identified by tracking a user interaction or input indicating that a user has purchased an item, requested information on an item, tagged an item with a "like" or similar identification, searched for an item, or added an item to a wish list, etc.

As used herein, the phrase "item" refers to a product, service, feature, or content that users purchase, receive, or use. Examples of items include, but are not limited to, clothes, toys, electronics, sporting goods, furniture, cars, books, documents, electronic content, webpages, apps, music, movies, hotel rooms, house rentals, houses for sale, flights, career opportunities, job opportunities, service providers, medical services, and home renovation services.

As used herein, the phrase "user" refers to any person, business, or other entity that exhibits interest in items and/or receives recommendations for items that are expected to be of interest.

As used herein, the phrase "interest items" refers to items in which a user is expected to be interested. For example, based on a user previously expressing positive interest in a first book, other books that are similar to the first book can be identified as interest items for the user.

As used herein, the phrase "matrix" refers to a rectangular array of numbers, symbols or expressions.

As used herein, the phrase "dimensions" refers to the number of columns and the number of rows of a matrix. Restricting the dimensions of a matrix can involve restricting the number of columns only, restricting the number of rows only, or restricting both the number of columns and the number of rows.

As used herein, the phrase "similarity matrix" refers to a matrix that identifies similarity between things, e.g., items, users, etc. For example, an item-to-item similarity matrix identifies similarities between given items, identifying that item I1 is more similar to item I2 than to item I3, etc. A user-to-user similarity matrix identifies similarities between given users, identifying that user U1 is more similar to user U2 than to User U3, etc. Similarity matrix can use numerical values to quantify the similarity between items, users, etc.

As used herein, the phrase "recommendation matrix" refers to a matrix that identifies expected interest of users in items from which item recommendations to users can be identified. In one example, a recommendation matrix initially includes known values that identify positive interest of users in items based on prior user interactions. Techniques of the invention complete the recommendation matrix by determining additional values, i.e., interest values, quantifying how much interest individual users are expected to have in individual items in which the users have not previously expressed positive interest.

As used herein, the phrase "regularized" refers to enforcing a condition to ensure sparsity, smoothness, or another condition. A variety of techniques are used to regularize a matrix including, but not limited to, enforcing a constraint such as low rank constraint and a using an optimization term to encourage a small Frobenius norm.

As used herein, the phrase "rank" refers to the number of linearly independent rows or columns of a matrix. As used herein, the phrase "low rank matrix" refers to an approximation of another matrix that has reduced rank.

As used herein, the phrase "rank constraint" refers to a constraint on a formulation used to determine values for a matrix that results in restricting the dimensions of smaller matrices used to determine the matrix. For example, n×n matrix can be determined by determining the product of an n×k matrix and a k×n matrix where k is the rank parameter of the rank constraint.

As used herein, the phrase "Frobenius norm constraint" refers to a constraint applied to limit an approximation of a matrix. A Frobenius norm constraint limits the magnitude of values in the approximation of the matrix. For example, a Frobenius norm constraint can be used in determining a similarity matrix to represent relationship in a recommendation matrix to ensure that the matrix represents generalized relationships between known values from the recommendation matrix.

As used herein, the phrase "single value decomposition (SVD)" refers to a mathematical technique that factorizes a matrix into several factors that allow values of the matrix to be determined.

As used herein, the phrase "randomized SVD" refers to a technique that approximates the SVD of a larger matrix by applying an SVD to a smaller matrix that approximates the larger matrix based on a random use of data from the larger matrix. For example, a randomized SVD technique can be used to approximate a recommendation matrix SVD by determining a smaller matrix based on a random matrix and the recommendation matrix and applying an SVD technique on the compressed matrix.

FIG. 1 is a block diagram illustrating an exemplary technique 1 for identifying items expected to be of interest to a user.

The technique 1 begins by receiving positive interest data, as shown in block 2. Such information can be collected by one or more information systems that track and collect information about purchases, likes, and other interactions from identified users.

In this example, the positive interest data is purchase data that is illustrated in table 3 in which each row represents a user and each column represents an item and the positive interest data can be used to populate particular values to indicate which users have expressed positive interest in which items. For computational purposes this data is used in an m×n matrix of m users and n items, i.e., an initial recommendation matrix represented by the rows and columns of table 3. The initial recommendation matrix can use a particular value to represent positive user interest determined based on a prior user interaction. In this example, a "P" represents that a user purchased an item. A blank value represents that the user has not purchased an item, which does not necessarily mean that the user has a negative opinion of the item. Blank spaces in the recommendation matrix thus represent unknowns, i.e., it is unknown at this point how much interest Joe is likely to have in Playset A, etc. Note that the positive interest data can represent various types of user interest. In this example, the positive interest data represents user purchases of particular items, e.g., that Bob has purchased particular items, however other types of user interest can additionally or alternatively be used. The positive interest matrix does not include data indicative of negative interest of particular users in particular items in certain techniques of the invention.

The technique 1 of FIG. 1 extrapolates based on relationships determined from the known values of the recommendation matrix to determine additional values that predict how interested users will be in items. The technique 1 does so by imposing constraints to ensure accurate extrapolations and uses computation techniques that make the computations feasible for large data sets. These constraints and computational techniques are described next.

The technique 1 models a similarity matrix representing relationships in the positive interest data of the initial recommendation matrix, as shown in block 4. For example, a model can be used that approximates values for the recommendation matrix using a product of the initial recommendation matrix R with a similarity matrix. Thus the product of the initial recommendation matrix with the similarity matrix determines approximate values for all of the values of the recommendation matrix. The approximated values can be compared with known values to determine the accuracy of the similarity matrix. A similarity matrix is determined based on this accuracy.

The technique 1 applies a rank constraint to the model as shown in block 5. Without the rank constraint, optimizing the similarity matrix to the known values would result in a similarity matrix that is simply an identity matrix. While an identify matrix would be entirely accurate to the known values, it would provide no ability to extrapolate to the make predictions from the known values. Thus, the technique 1 applies a rank constraint that limits the possible values of the similarity matrix to ensure that the similarity represents generalized relationships usable to extrapolate from the known values.

The rank constraint is used to restrict the model of the similarity matrix. Specifically, the similarity matrix is modeled as the product of two smaller matrices. Applying the rank constraint restricts the dimensions of these matrices. Because these matrices are required to be small, the relationships between individual data elements in the original recommendation matrix most be compactly represented and thus usable to extrapolate interest values, i.e., values quantifying how much interest individual users are expected to have in individual items in which the users have not previously expressed positive interest.

The technique 1 determines the similarity matrix using a randomized SVD technique, as shown in block 6. Using the randomized SVD makes computing the similarity matrix representing the generalized relationships computationally feasible. As discussed above, modeling the similarity matrix involves determining several relatively smaller matrices that combine to produce the similarity matrix. An SVD technique is used to determine at least one of these two matrices. Rather than applying an SVD technique to the recommendation matrix directly to produce a factor used as one of the smaller matrices in the similarity matrix determination, a randomized SVD technique is used to approximate that factor. Specifically, an SVD is instead applied on a compressed approximation of the recommendation matrix that is determined using randomization. This randomized SVD technique can be used to efficiently compute the factor, which is then used as one of the smaller matrices used to produce the similarity matrix. This makes the technique 1 feasible for large scale environments involving millions of users and millions of items.

The technique 1 next determines interest values using the similarity matrix, as shown in block 7. In other words, the technique 1 determines values to complete the recommendation matrix. These values quantify how much interest individual users are expected to have in individual items in which the users have not previously expressed positive interest. This is illustrated in table 8 representing a completed recommendation matrix. Each row of the recommendation matrix provides information about a particular user's expected relative interest in the individual items. For example, table 8 shows a row of the recommendation matrix for a user ("Bob") with a 0.9 interest value for a dome climber C, a 0.8 interest value for a rock wall D, a 0.2 interest in bicycle E, a 0.4 interest value in bike pegs F, and a 0.5 interest value in skateboard ramp G.

The technique 1 ranks item recommendations as shown in block 9 and provides a recommendation 10. In this example, the technique 1 provides the top three item recommendations for Bob, identifying the items in Bob's row of the recommendation matrix that have the three highest values and recommends these three products. The order of products in a multi-product recommendation can also be based on the relative ranks, e.g., presenting the item with the top value first, the item with the next highest value second, etc. In this example, the recommendation 10 identifies the dome climber C, rock wall D, skateboard ramp G as the top 3 items for Bob based on these three items having the top interest values of items that Bob has not already purchased. Item recommendations can be provided on one or more computing devices for display to the users themselves, marketers, and/or any other appropriate party. The item recommendations, for example, can be determined on a server and then sent over a network for display on one or more computing devices.

Figure 2:
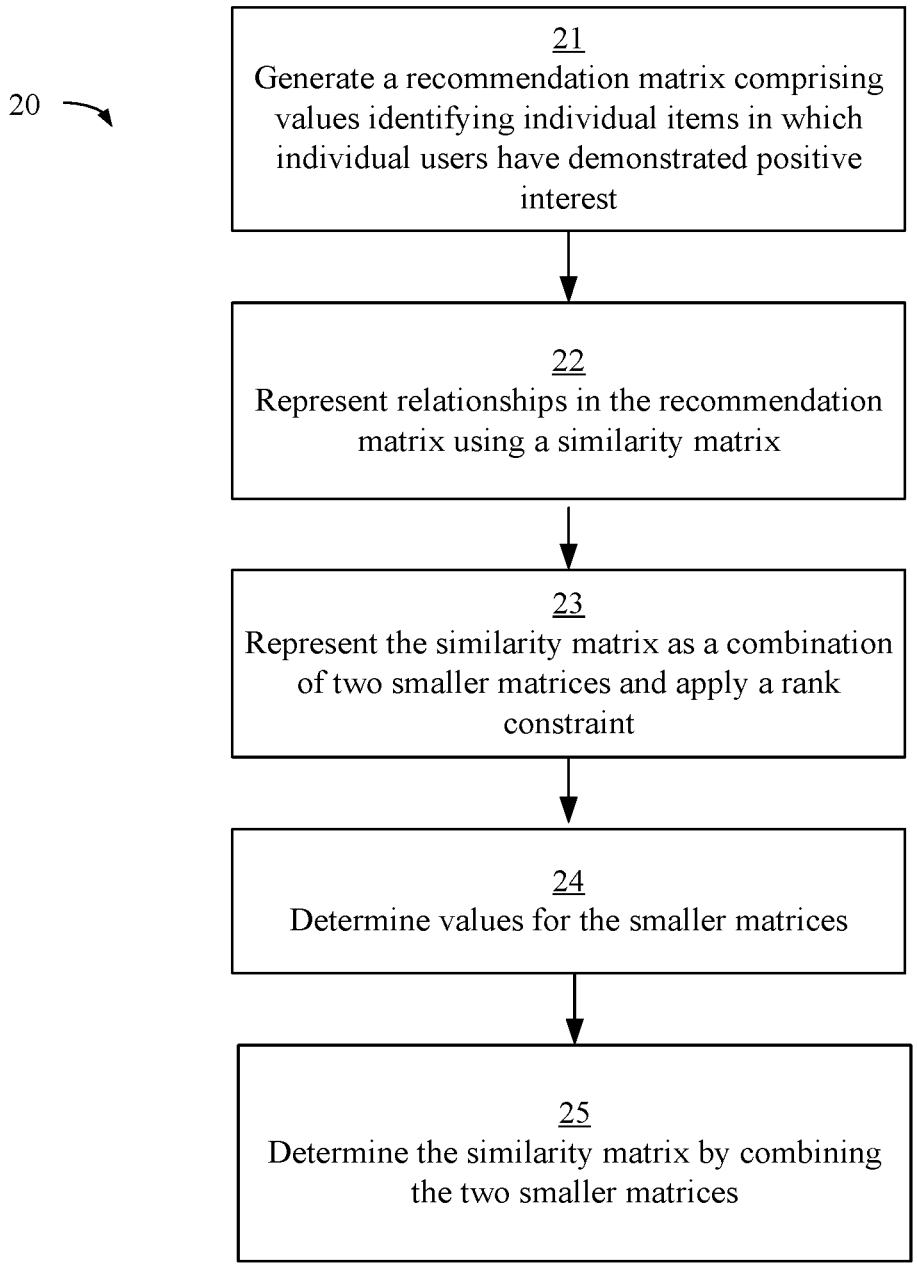
FIG. 2 is a flow chart illustrating an exemplary technique for determining a similarity matrix representing relationships in positive interest data of a recommendation matrix based on a rank constraint.

FIG. 2 is a flow chart illustrating an exemplary technique 20 for determining a similarity matrix representing relationships in positive interest data of a recommendation matrix based on a rank constraint. Technique 20 can, for example, be performed on the analysis server 51 illustrated in FIG. 5 or on any other suitable computing device.

The technique 20 generates a recommendation matrix comprising values identifying individual items in which individual users have demonstrated positive interest, as shown in block 21. Such a recommendation matrix can be created by populating a matrix with purchase or other user interest data that is identified based on tracking user interactions. As in the example of the recommendation matrix illustrated by table 3 in FIG. 1, in the recommendation matrix each row can represent a user and each column can represent an item, or vice versa, and positive interest data can be used to populate particular values to indicate which users have expressed positive interest in which items based on prior user interactions.

The technique 20 determines and uses a model to determine a similarity matrix that can be used to extrapolate values matrix based on relationships determined from the known values. The extrapolated values (i.e., interest values) quantify how much interest individual users are expected to have in individual items in which individual users have not previously expressed positive interest. The technique 20 imposes a rank constraint in the model used to determine the similarity matrix as explained next.

The technique 20 represents relationships in the recommendation matrix using a similarity matrix, as shown in block 22. This similarity matrix ideally represents relationships that can be used to create an approximation of all the values of the recommendation matrix where the approximations corresponding to known values are accurate. For example, if user U1 has already purchased book B1, estimates of user interest values based on the similarity matrix will predict the user's interest in the book, e.g., providing an interest value close to 1 on an interest scale from 0 to 1. Moreover, the similarity matrix also ideally represents relationships that are sufficiently generalized to enable useful predictions of interest values. For example, if user U1 has not already purchased book B2, estimates of user interest values based on the similarity matrix will predict the user's interest in the book based on the user having purchased some of the same books as other users who purchased book B2.

Techniques of the invention determine interest values of the recommendation matrix by determining the product of the initial recommendation matrix with the similarity matrix. The techniques determine a similarity matrix that will produce estimates of interest values of the recommendation matrix that are as similar to known values as possible subject. However, the similarity matrix is determined subject to one or more constraints, discussed below, that also ensure that the similarity matrix represents relationships that are sufficiently generalized to allow extrapolation to determine interest values that quantify how much interest individual users are expected to have in individual items in which individual users have not previously expressed positive interest.

The following formulation is provided as an example. Let U denote a set of users, and I a set of items, with m=|U| and n=|I|. An initial recommendation matrix (e.g., a purchase matrix) is denoted by $R \in \{0,1\}^{m \times n}$. In this example, a recommendation matrix includes purchase data, however, the techniques are applicable to other types of positive interest data. The technique 20 provides a formulation for determining a similarity matrix W so that the product of the initial recommendation matrix R and W provides a completed recommendation matrix R that include extrapolated interest values while also providing estimates that are accurate relative to known values in the initial recommendation matrix R.

In an (item-based) neighborhood method implementation, a recommendation matrix is used and has the form:

$$\hat{R} = RW \quad (1)$$

where $W \in \{0,1\}^{n \times n}$ is some item-similarity matrix.

Linear regression methods, which are methods that attempt to identify relationships amongst data, can be used to determine the similarity matrix, W from the data, i.e., from the recommendation matrix R. However, linear regression methods generally involve solving a large number of regression sub-problems on a very large recommendation matrix R, making use of linear methods ill-suited for real world applications where the number of users and items is in the millions. The following technique provides an efficient way to determine the similarity matrix W while also ensuring that W has the desired properties.

The technique 20 represents relationships in the similarity matrix as a combination of two smaller matrices and applies a rank constraint, as shown in block 23. The rank constraint is used to ensure that a similarity matrix identifies relationships between items and/or users that are generalized. Because these matrices are required to be small, the relationships between individual data elements in the initial recommendation matrix that are represented in the matrices are forced to be compactly captured. When the matrices are then used to form the similarity matrix, the similarity matrix better represents general similarities between items. If there were no such constraint, the similarity matrix that best fits known values would be an identity matrix that simply identifies relationships between known values. However, the identity matrix is not usable to extrapolate interest values. In contrast, using the rank constraint ensures that the similarity matrix will represent generalized relationships that can be used to extrapolate values the interest values.

In the exemplary formulation discussed above using R and W, the formulation for determining the similarity matrix W using a rank constraint attempts to minimize differences between the known values of the initial recommendation matrix R and the completed recommendation, which is determined as the product of the initial recommendation matrix R with the similarity matrix W. The formulation is written as:

$$\underset{rank(W) \leq k}{\operatorname{argmin}} \|R - RW\|_F^2 \quad (2)$$

where, typically, k<<n, i.e., the rank constraint parameter is much smaller than the number of items represented in the similarity matrix.

The optimal solution of (2) is given by the Eckart-Young theorem which represents W as the combination of two smaller matrices.

$$W = Q_k Q_k^T \quad (3)$$

where $Q_k$ is an orthonormal matrix and $Q_k^T$ is the transpose of that orthonormal matrix. The sizes of these matrices are constrained to rank parameter k. For example, an n×n similarity matrix can be represented by a product of an n×k ($Q_k$) matrix with a k×n ($Q_k^T$) matrix where k is the rank parameter of the rank constraint. The lower the rank parameter, the less the model is expected to overfit the data, and hence the better it is expected to generalize. However, a lower rank can also result in higher error, e.g., deviations of approximations from known positive interest data values. Accordingly, techniques of the invention select a rank parameter k to balance between generalization and error depending on the circumstances. One technique determines the rank parameter by testing the accuracy of potential rank parameters. For example, a cross validation technique withholds some data, creates different models using various rank parameters, and selects the rank parameter that determines values that best match the withheld data.

The technique 20 next determines values for the smaller matrices, as shown in block 24. This can be done using an appropriate regression solution technique. In the exemplary formulation discussed above using R and W and in which the similarity matrix W is modeled as in equation (3), the values for the smaller matrices can be determined by performing an SVD on the recommendation matrix R.

$$R \approx P_k \Sigma_k Q_k^T \quad (4)$$

Since this SVD produces $Q_k^T$, the results of the SVD can be used to determine the smaller matrices $Q_k$ and $Q_k^T$. As described below, computing the SVD of the recommendation matrix R can be made computationally feasible in the case of large datasets using a randomized SVD technique. Also, as describe below with respect to FIG. 3, the technique can be modified to account for additional constraints such as a Frobenius norm constraint.

The technique 20 next determines the similarity matrix by combining the two smaller matrices, as shown in block 24. In the exemplary formulation discussed above using R and W and in which W is modeled as in equation (3), the similarity matrix W is determined by determining the product of the smaller matrices $Q_k$ and $Q_k^T$.

FIG. 3 is a flow chart illustrating an exemplary technique for determining a similarity matrix representing relationships in positive interest data of a recommendation matrix based on a rank constraint and a Frobenius norm constraint. Technique 30 can, for example, be performed on the analysis server 51 illustrated in FIG. 5 or on any other suitable computing device.

The technique 30 generates a recommendation matrix comprising values identifying individual items in which individual users have demonstrated positive interest, as shown in block 31. Such a recommendation matrix can be created as described above with respect to block 21 of FIG. 2.

The technique 30 further involves determining a formulation for a similarity matrix that represent relationships in the recommendation matrix, where the formulation is subject to a rank constraint and a Frobenius norm constraint, as shown in block 32. Using two constraints can further ensure that the similarity matrix represents sufficiently generalized relationships to allow extrapolation to determine interest values quantifying how much interest individual users are expected to have in individual items in which the individual users have not previously expressed positive interest.

The following example illustrates a formulation for a similarity matrix that represent relationships in the recommendation matrix, where the formulation is subject to a rank constraint and a Frobenius norm constraint. This formulation builds off of the formulation of equation 1 in which a recommendation matrix has the form $\hat{R}=RW$. Determining a similarity matrix subject to a rank constraint and a Frobenius norm constraint amounts to solving the following optimization problem:

$$\underset{rank(W)\leq k}{\operatorname{argmin}} \|R - RW\|_F^2 + \lambda\|W\|_F^2 \quad (5)$$

where, typically, k<<n. In this equation the first term, $\|R-RW\|_F^2$, ensures that the similarity matrix W will make accurate approximations. This term attempts to minimize differences between the known values of the initial recommendation matrix R and the completed recommendation, which is determined as the product of the initial recommendation matrix R with the similarity matrix W. The second term, $\lambda\|W\|_F^2$, applies the Frobenius norm constraint, and the parameter of the minimization, $rank(W)\leq k$, applies the rank constraint.

It is not feasible to directly solve equation (5). Under both a low-rank constraint and a Frobenius norm constraint (i.e., where the Frobenius norm parameter $\lambda>0$) in (5), finding the optimal similarity matrix W involves solving a hard nonconvex problem with no analytical solution in general. However, a technique can be used to solve for an approximation that represents the similarity matrix W in this formulation as the product of two smaller matrices. One of these matrices is determined by enforcing the rank constraint. The second matrix is determined to enforce the Frobenius norm constraint. More specifically, the second matrix is solved using the result of the first determination so that the rank constraint does not have to be directly enforced in the same computation as the Frobenius norm constraint. This technique is described with respect to blocks 33-35 of FIG. 3.

The technique 30 involves representing the similarity matrix W as a combination of two smaller matrices, as shown in block 33. In the above described formulation of equation (5), the similarity matrix W is represented as the product a first matrix $Q_k$ (that will be determined based on the rank constraint without the Frobenius norm constraint) and a second matrix Y (that will be determined using the results of the first matrix determination to avoid having to expressly include a rank constraint), as will be explained in more detail below. Thus, the similarity matrix will be determined using:

$$W=Q_k Y \quad (6)$$

The technique 30 involves determining values for the first smaller matrix by enforcing the rank constraint without enforcing the Frobenius norm constraint, as shown in block 34. In the exemplary formulation, this determination involves solving for $Q_k$. Note that for $\lambda=0$ (i.e., where there is no Frobenius norm constraint), the optimal solution of FIG. 5) is given by the $W=Q_k Q_k^T$ and that the similarity matrix can be determined using smaller matrices determined using a SVD technique as explained above with respect to FIG. 2. Thus, $Q_k$, the first matrix in equation 6 is determined in a manner similar to determining $Q_k$ as described with respect to FIG. 2. However, unlike in equation (3) and FIG. 2, the second matrix of the representation of the similarity matrix W is determined using a different technique. A different matrix Y is used rather than $Q_k^T$.

The technique 30 involves using the values for the first smaller matrix to determine values for the second smaller matrix using a formulation that applies the Frobenius norm constraint, as shown in block 35. In the above example of equation (6), this involves determining values for Y rather than using as was used in equation (3). Combining equations (5) and (6) allows the results of the first determination, i.e., $Q_k$, to be used without expressly requiring the rank constraint. However, the rank of the similarity matrix W is automatically controlled because the size of Y depends on the size of $Q_k$. Y can thus be determined using the following formulation that replaces W from FIG. 5 with $Q_k Y$ from equation (6):

$$\underset{Y}{\operatorname{argmin}} \|R - RQ_k Y\|_F^2 + \lambda\|Q_k Y\|_F^2 \quad (7)$$

Since $Q_k$ is orthonormal, $\|Q_k Y\|_F = \|Y\|_F$, and (8) becomes:

$$\underset{Y}{\operatorname{argmin}} \|R - RQ_k Y\|_F^2 + \lambda\|Y\|_F^2 \quad (8)$$

This can be solved analytically to give:

$$Y=(Q_k^T R^T R Q_k + \lambda I)^{-1} Q_k^T R^T R \quad (10)$$

This inversion involves a k×k matrix, and hence it is tractable. Thus the values of the smaller matrices $Q_k$ and Y are determined and can be used to determine the similarity matrix.

After determining the smaller matrices, the technique 30 further involves determining the similarity matrix by combining the two smaller matrices, as shown in block 46. In the above formulation of equation (6) the similarity matrix W is determined by computing the product of the smaller matrices $Q_k$ and Y.

Equation (7) is referred to herein as I-Linear-Flow as it corresponds to an item-item model in which an item-to-item similarity matrix is determined. In the I-Linear-Flow model, the item-item similarity is explicitly given by the similarity matrix $W=Q_k Y$. An alternative form of the similarity matrix W uses user-user model, referred to herein as U-Linear-Flow. This models the similarity matrix $W=YP_k^T$. $P_k^T$ is determined based on the SVD applied to the recommendation matrix R, as shown in equation (4), which determines $R \approx P_k \Sigma_k Q_k^T$. Once $P_k^T$ is determined, the model combines $W = YP_k^T$ with equation (5) to provide a formulation to determine Y:

$$\underset{Y}{\operatorname{argmin}} \|R - YP_k^T R\|_F^2 + \lambda \|Y\|_F^2 \quad (11)$$

This formulation can be solved using similar techniques as were discussed above with respect to solving for Y in equation (7). Y is determined and used to determine a user-to-user similarity matrix W, which can then be used to determine interest values and identify other similarities useful in providing recommendations to users.

Note that an SVD of the recommendation matrix R thus provides inputs that are useful in formulating both an item-to-item similarity matrix (e.g., $Q_k$) as well as a user-to-user similarity matrix (e.g., $P_k^T$). Being able to use the singe SVD computation for both purposes provides additional computational advantages for techniques that determine both an item-to-item similarity matrix and a user-to-user similarity matrix, since the computations only need to be performed once.

Techniques of the invention create a recommendation matrix by first creating a similarity matrix (item-to-item, user-to-user, etc.). One benefit to such a formulation is that it creates a similarity matrix that is useful for other purposes. For example, an item-to-item similarity matrix is useful to respond to user requests for similar items, to present similar items during user browsing/viewing a particular item, and to provide the "reason" why one or more items are recommended to the user. Even items that are not in the same category as one another can be identified as similar items using an item-to-item similarity matrix.

Item-to-item similarity identified using a similarity matrix can be used to provide a reason for recommending an item to a user. For example, items that the user has purchased or otherwise expressed positive interest in that are similar to recommended items can be suggested as a reason for the recommendation. For example, the recommendation to the user could state "Shovel B is recommended based on your purchase of tent A" based on identifying that a recommended item, i.e., Shovel B is most similar a particular item purchased by the user, i.e., Tent A of all of the items purchased by the user.

Figure 4:
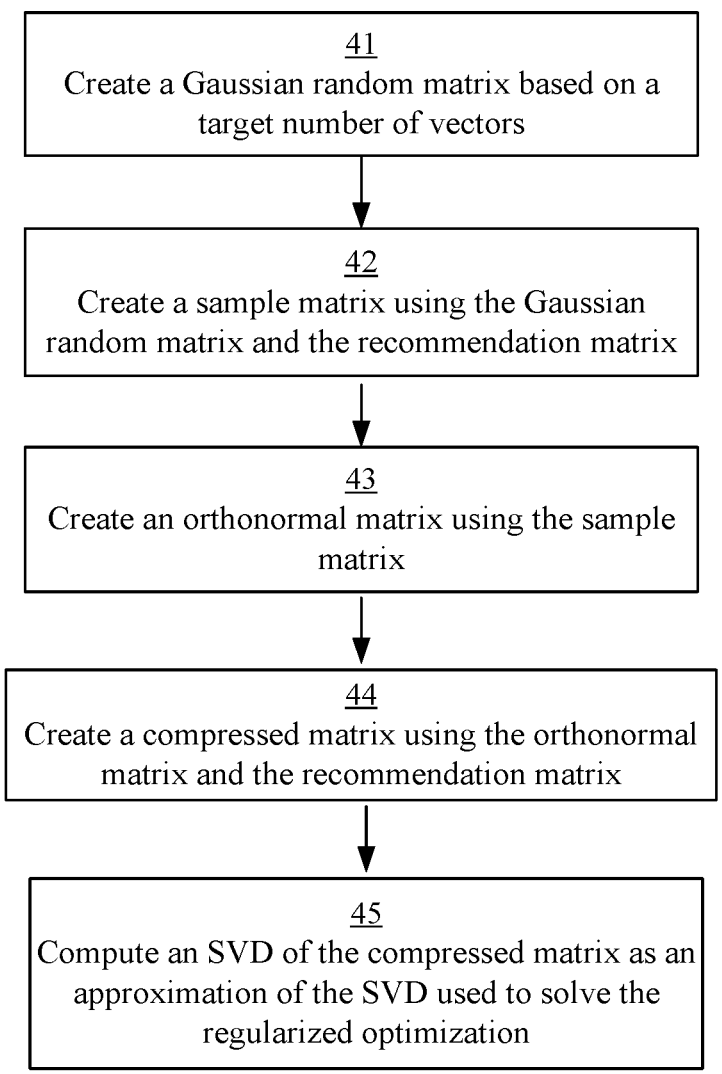
FIG. 4 is a flow chart illustrating an exemplary method 40 for approximating a matrix such as using recommendation matrix using a randomized SVD.

FIG. 4 is a flow chart illustrating an exemplary method 40 for approximating a matrix such as using recommendation matrix using a randomized SVD. Method 40 can, for example, be performed on the analysis server 51 illustrated in FIG. 5 or on any other suitable computing device. As discussed above, a SVD technique can be used to determine factors that allow a similarity matrix to be determined, e.g., by approximating the recommendation as $R \approx P_k \Sigma_k Q_k^T$ and using one or more these values to determine inputs used to determine as similarity matrix. In other words, an SVD technique is used to identify relationships in a recommendation matrix that will be represented in the similarity matrix. As discussed above, however, directly using an SVD technique on a recommendation matrix in large scale environments involving millions of users and millions of items is computationally infeasible. Accordingly, an SVD is instead applied on a smaller approximation of the recommendation matrix that is determined using randomization. This randomized SVD technique can be used to efficiently compute the input matrices used to determine similarity matrices, making the technique feasible for large scale environments involving millions of users and millions of items. FIG. 4 illustrates a randomized SVD technique 40 used for this purpose.

The technique 40 involves creating a Gaussian random matrix based on a target number of vectors, as shown in block 41. This Gaussian random matrix will later be used to create a compressed matrix that approximates the recommendation matrix. The purpose of creating the Gaussian random matrix, i.e., using randomness is to ensure the compressed matrix that is created accurately represents the data within the recommendation matrix. Moreover, the purpose of using the target number of vector is to ensure that the Gaussian random matrix and the resulting compressed matrix that is created have a manageable size.

The technique 40 next creates a sample matrix using the Gaussian random matrix and the recommendation matrix, as shown in block 42. This essentially uses the Gaussian random matrix so that random data from the recommendation matrix is selected to ensure ultimately that the compressed matrix that is created will accurately represent the recommendation matrix.

The technique 40 next creates an orthonormal matrix using the sample matrix, as shown in block 43. Doing so essentially creates a form of the sample matrix that can be combined with the recommendation matrix to produce the compressed matrix. The technique 40 then creates a compressed matrix using the orthonormal matrix and the recommendation matrix, as shown in block 44. The technique 40 then computes an SVD of the compressed matrix as an approximation of the SVD used to solve the regularized optimization.

In a particular implementation, technique 40 uses a recommendation matrix R that is an m×n matrix. In this implementation, the randomized SVD technique comprises computing an approximate low-rank factorization based on a target number k of singular vectors. The technique creates an n×k Gaussian random matrix $\Omega$ and creates an m×k sample matrix A using the Gaussian random matrix $\Omega$ and the recommendation matrix R, wherein $A = R\Omega$. The technique creates an m×k orthonormal matrix Z using the sample matrix A, such that $A = ZX$ (where X is a residual matrix that is needed to bring A into the form $A = ZX$ with Z orthonormal; the matrix X is not used in the rest of the algorithm) and constructs a k×n matrix B, wherein $B = Z^T R$. The technique then computes the SVD of the matrix B as an approximation of the SVD to provide values used to determine a similarity matrix using the techniques of FIG. 3 or 4. This randomized SVD technique is summarized in the following table:

---

Algorithm 1 Given $R \in \mathbb{R}^{m \times n}$, compute approximate rank - k SVD; $R \approx P_k \Sigma_k Q_k$ 1:   procedure RSVD(R, k)
2:       Draw n × k Gaussian random matrix $\Omega$
3:       Construct n × k sample matrix $A = R\Omega$
4:       Construct m × k orthonormal matrix Z, such that $A = Z X$
5:       Constuct k × n matrix $B = Z^T R$
6:       Compute the SVD of B, $B = \hat{P}_k \Sigma_k Q_k$
7:       $R \Rightarrow Z B \Rightarrow Z \hat{P}_k \Sigma_k Q_k \Rightarrow P_k \Sigma_k Q_k$, where $P_k = Z \hat{P}_k$
8:       return $P_k \Sigma_k Q_k$
9:   end procedure

---

Exemplary Computing Environment

The techniques disclosed herein, including but not limited to, the techniques 20, 30, 40 illustrated in FIGS. 2-4 can be implemented by storing programmed instructions on a computer-readable medium and using a processor to execute the instructions. The processor can include, but not be limited to, a computing device that includes a processor, microprocessor, microcontroller device, or is comprised of control logic including integrated circuits such as, for example, an Application Specific Integrated Circuit (ASIC) for performing the specific functions of the techniques disclosed herein. The instructions can be compiled from source code instructions provided in accordance with a programming language such as Java, C, C++, C #.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a non-transitory computer-readable medium such as a computer memory or storage device which may be any suitable memory apparatus, such as, but not limited to ROM, PROM, EEPROM, RAM, flash memory, disk drive and the like.

Figure 5:
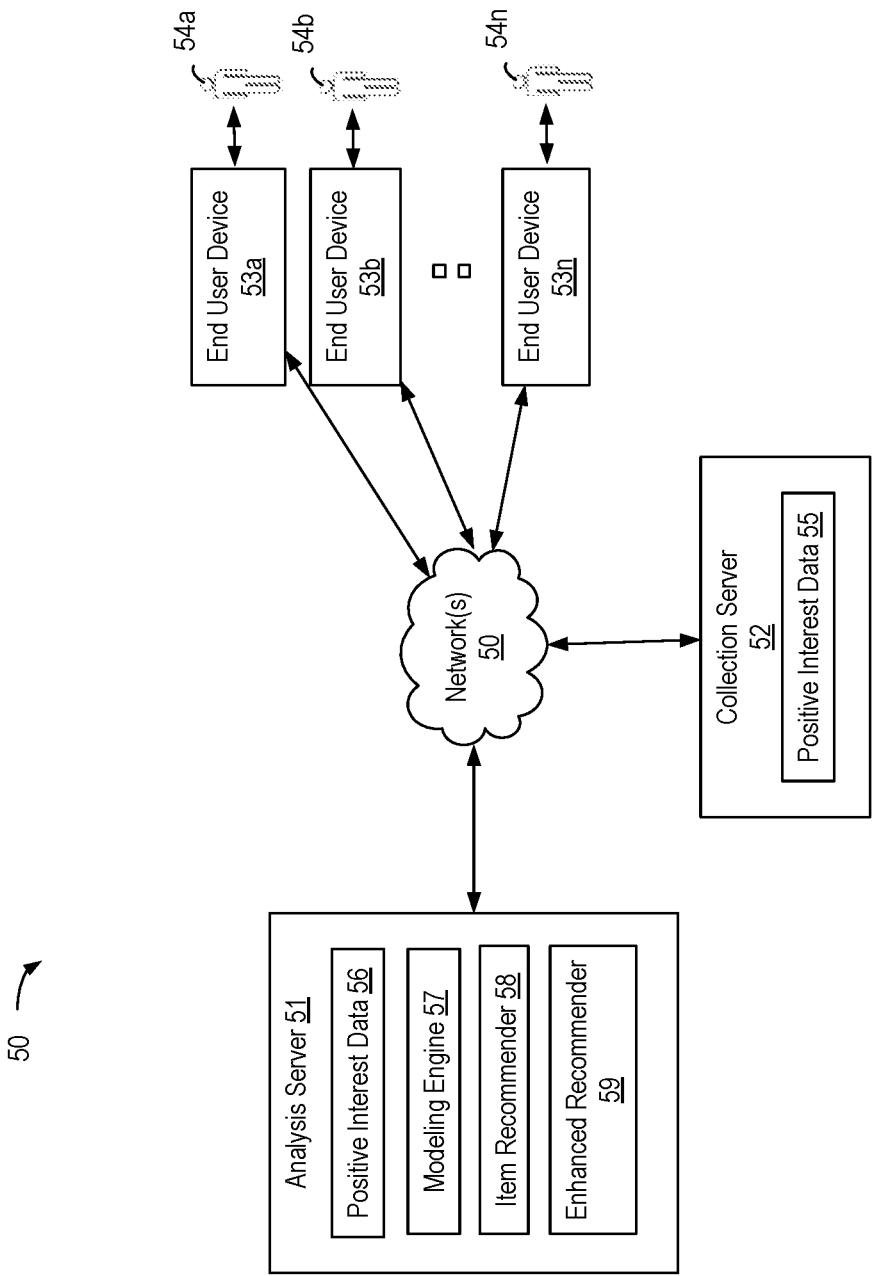
FIG. 5 is a block diagram illustrating an exemplary system for identifying items expected to be of interest to a user based on positive interest information of many users and many items.

FIG. 5 is a block diagram illustrating an exemplary system 50 for identifying items expected to be of interest to a user based on positive interest information of many users and many items. System 50 includes an analysis server 51, a collection server 52, and end user devices 53a-n. End users 54a-n use end user devices 53a-n to provide user interactions that provide positive interest data. For example, users can respond to advertisements, purchase items, conduct internet searches and make other selection and actions that are interpreted to identify that the user has a positive interest in particular products. A collection server 52 collects this information as positive interest data 55. The collection server 55 is a single device in one technique of the invention. In another technique, the collection server 55 compiles information from multiple other collection servers operated by the same or additional business entities. The collection server 55 can additionally or alternatively be combined with or included as part of analytics server 51.

Analytics server 51 includes positive interest data 56, a modeling engine 57, an item recommender 58, and an enhanced recommender 59. The positive interest data 56 is retrieved from the collection server 52 and used by the modeling engine 57 to determine a similarity matrix and then a recommendation matrix used to identify items expected to be of interest to users. Thus the modeling engine 57 can be used to perform the exemplary techniques of FIGS. 2-4 and the like. The item recommender 58 formulates recommendations based on the identified recommended items. For example, item recommender identifies the Top-N items for a user based on a recommendation matrix in one technique. The enhanced recommender 56 provides additional determinations to provide more information with item recommendations provided to users. For example, the item recommender 56 uses an item-to-item similarity matrix in one technique to provide a reason for recommending particular items to the user.

The analytics server 51 can provide the item recommendations via network 50 to end users 54a-n using end user devices 53a-n, to devices of marketers, or any other appropriate party. For example, item recommendations can be determined on the analytics server 51 for a particular end user 54a and then provided to the end user 54a for display in a webpage when end user 54a uses end user device 53a to access the webpage. Similarly, recommendations can be provided to end users via e-mails, text messages, and/or in advertisements provided with search results, social network, and in other contexts in which the identity of the end users are known.

Figure 6:
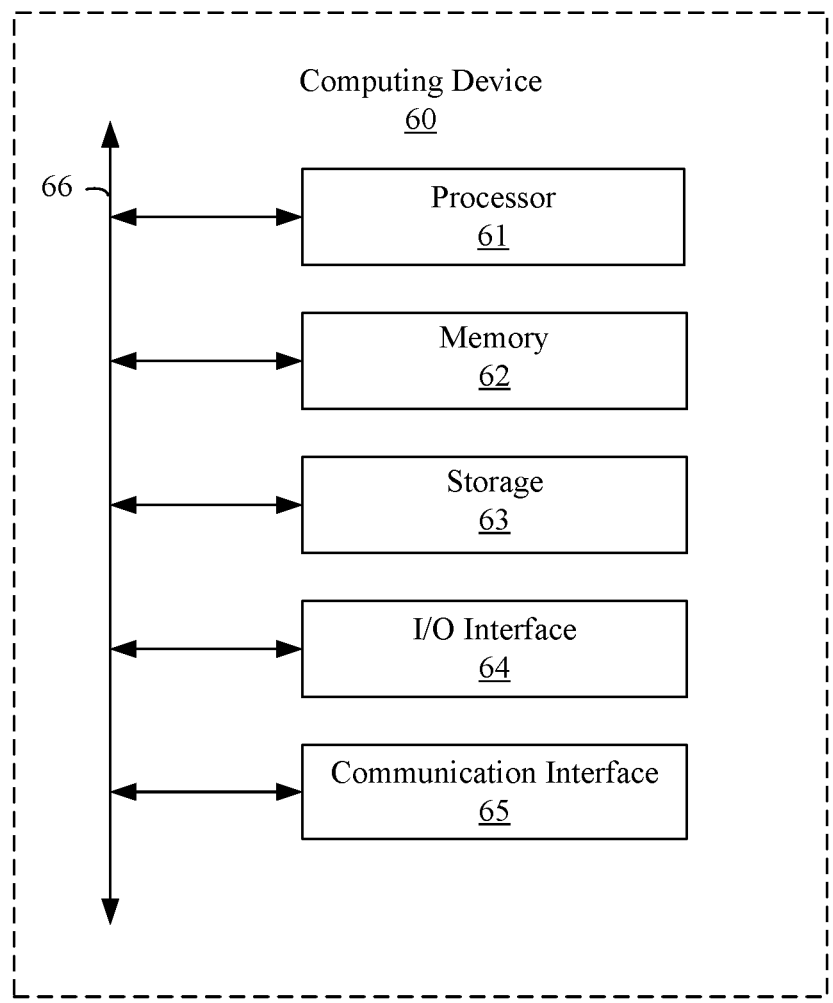
FIG. 6 is a block diagram depicting an example hardware implementation.

Any suitable computing system or group of computing systems can be used to implement the techniques and methods disclosed herein. For example, FIG. 6 is a block diagram depicting examples of implementations of such components. The computing device 60 can include a processor 61 that is communicatively coupled to a memory 62 and that executes computer-executable program code and/or accesses information stored in memory 62 or storage 63. The processor 61 may comprise a microprocessor, an application-specific integrated circuit ("ASIC"), a state machine, or other processing device. The processor 61 can include one processing device or more than one processing device. Such a processor can include or may be in communication with a computer-readable medium storing instructions that, when executed by the processor 61, cause the processor to perform the operations described herein.

The memory 62 and storage 63 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C #, Visual Basic, Java, Python, Perl, JavaScript, and ActionScript.

The computing device 60 may also comprise a number of external or internal devices such as input or output devices. For example, the computing device is shown with an input/output ("I/O") interface 64 that can receive input from input devices or provide output to output devices. A communication interface 65 may also be included in the computing device 60 and can include any device or group of devices suitable for establishing a wired or wireless data connection to one or more data networks. Non-limiting examples of the communication interface 65 include an Ethernet network adapter, a modem, and/or the like. The computing device 60 can transmit messages as electronic or optical signals via the communication interface 65. A bus 66 can also be included to communicatively couple one or more components of the computing device 60.

The computing device 60 can execute program code that configures the processor 61 to perform one or more of the operations described above. The program code can include one or more modules. The program code may be resident in the memory 62, storage 63, or any suitable computer-readable medium and may be executed by the processor 61 or any other suitable processor. In some techniques, modules can be resident in the memory 62. In additional or alternative techniques, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more techniques of the present subject matter. Any suitable programming, scripting, or other type of language or combinations of languages may be used to implement the teachings contained herein in software to be used in programming or configuring a computing device.

Techniques of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific techniques thereof, it will be appreciated that those skilled in the art, upon attaining an understanding of the foregoing, may readily produce alterations to, variations of, and equivalents to such techniques. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for identifying interest items for a user based on positive interest information of many users and many items, the method comprising:
    collecting, by a collection server, positive interest information based on interactions of a plurality of users with a plurality of items via an online platform;
    generating a recommendation matrix representing the positive interest information;
    determining, by a modeling engine, values of a similarity matrix quantifying relationships between the plurality of items
    by applying a rank constraint to a first matrix to obtain a representation of the relationships between the plurality of items, wherein the rank constraint restricts the first matrix to have a number of columns that is less than a number of columns of the similarity matrix, and wherein the similarity matrix is a product of the first matrix and a second matrix;
    computing, by the modeling engine, a product of the recommendation matrix and the similarity matrix to obtain a completed recommendation matrix that includes an extrapolated interest value between a user of the plurality of users and at least one of the plurality of items;
    determining interest values representing user interest in items determined based on the values of the completed recommendation matrix;
    identifying, by an item recommender, interest items for the user based on the interest values of the recommendation matrix; and
    displaying the interest items to the user on the online platform.

2. The method of claim 1, wherein generating the recommendation matrix further comprises:
    creating a Gaussian random matrix based on a target number of vectors;
    creating a sample matrix using the Gaussian random matrix and the recommendation matrix;
    creating an orthonormal matrix using the sample matrix; and
    compressing the recommendation matrix using the orthonormal matrix and the recommendation matrix.

3. The method of claim 1, wherein the recommendation matrix R is an m×n matrix, wherein generating the recommendation matrix further comprises:
    creating the random matrix as an n×k Gaussian random matrix $\Omega$, wherein k is a target number;
    creating an m×k sample matrix A using the Gaussian random matrix $\Omega$ and the recommendation matrix R, wherein $A=R\Omega$;
    creating an m×k orthonormal matrix Z using the sample matrix A, such that $A=ZX$, wherein X is a residual matrix used to bring A into the form $A=ZX$ with Z orthonormal; and
    constructing a k×n matrix B as a compressed matrix, wherein $B=Z^TR$.

4. The method of claim 1, wherein determining the values of the similarity matrix comprises determining the values of the similarity matrix without using information of negative interest of users in items.

5. The method of claim 1, further comprising applying a rank constraint in the model to restrict dimensions of the first matrix and the second matrix.

6. The method of claim 1, wherein identifying the interest items for the user comprises identifying a top N number of items based on the values representing the interest of the user in the individual items.

7. The method of claim 1, wherein identifying the interest items for the user comprises identifying purchase information of items purchased by users.

8. A system for identifying interest items for a user based on positive interest information of a plurality of users and a plurality of items, the system comprising:
    a processor; and
    a non-transitory computer-readable medium comprising instructions, wherein, when the instructions are executed by the processor, the processor performs operations comprising:
        generating a recommendation matrix representing the positive interest information;
        determining values of a similarity matrix quantifying relationships between the plurality of items by applying a rank constraint to a first matrix to obtain a representation of the relationships between the plurality of items, wherein the rank constraint restricts the first matrix to have a number of columns that is less than a number of columns of the similarity matrix, and wherein the similarity matrix is the product of the first matrix and a second matrix;

computing a product of the recommendation matrix and the similarity matrix to obtain a completed recommendation matrix that includes an extrapolated interest value between a user of the of the plurality of users and at least one of the plurality of items;

determining interest values representing user interest in items determined based on the values of the completed recommendation matrix;

identifying interest items for the user based on the interest values of the recommendation matrix; and displaying the interest items to the user via an online platform.

9. The system of claim 8, wherein generating the recommendation matrix further comprises:
creating the random matrix as a Gaussian random matrix based on a target number of vectors;
creating a sample matrix using the Gaussian random matrix and the recommendation matrix;
creating an orthonormal matrix using the sample matrix; and
compressing the recommendation matrix using the orthonormal matrix and the recommendation matrix.

10. The system of claim 8, wherein the recommendation matrix R is an m×n matrix, and wherein generating the recommendation matrix further comprises:
creating the random matrix as an n×k Gaussian random matrix $\Omega$, wherein k is a target number;
creating an m×k sample matrix A using the Gaussian random matrix $\Omega$ and the recommendation matrix R, wherein $A=R\Omega$;
creating an m×k orthonormal matrix Z using the sample matrix A, such that $A=ZX$, wherein X is a residual matrix used to bring A into the form $A=ZX$ with Z orthonormal; and
constructing a k×n matrix B as compressed matrix, wherein $B=Z^T R$.

11. The system of claim 8, wherein determining the values of the similarity matrix comprises determining the values of the similarity matrix without using information of negative interest of users in items.

12. The system of claim 8, further comprising applying a rank constraint in the model to restrict dimensions of the first matrix and the second matrix.

13. The system of claim 8, wherein identifying the interest items for the user comprises identifying a top N number of items based on the values representing the interest of the user in the individual items.

14. The system of claim 8, wherein identifying the interest items for the user comprises identifying purchase information of items purchased by users.

15. A non-transitory computer-readable medium for identifying interest items for a user based on positive interest information of a plurality of users and a plurality of items, comprising instructions that, when executed by at least one processor, cause a computer device to:
collect, from a server, positive interest information based on interactions of the plurality of users with the plurality of items via an online platform,
generate an initial recommendation matrix representing the positive interest information;
determine values of a similarity matrix quantifying relationships between items or relationships between users by
determining a model of the similarity matrix as a product of a first matrix and a second matrix;
compressing the initial recommendation matrix using a random matrix to determine a compressed matrix representing the initial recommendation matrix;
applying a single value decomposition (SVD) technique to the compressed matrix to determine values for the first matrix or values for the second matrix;
applying a rank constraint to the first matrix that causes the first matrix to have fewer parameters than the similarity matrix; and
determining the product of the first matrix and the second matrix to determine the values of the similarity matrix;
and wherein the non-transitory computer-readable medium further comprises instructions to compute a product of the initial recommendation matrix and the similarity matrix to obtain a completed recommendation matrix that includes an extrapolated interest value between the user and at least one of the plurality of items;
identify interest items for the user based on the interest values of the recommendation matrix; and
display the interest items to the user on the online platform.

16. The non-transitory computer-readable medium of claim 15, wherein the instructions that, when executed by the at least one processor, cause the computer device to compress the recommendation matrix further comprise instructions that, when executed by the at least one processor, cause the computer device to:
create the random matrix as a Gaussian random matrix based on a target number of vectors;
create a sample matrix using the Gaussian random matrix and the recommendation matrix;
create an orthonormal matrix using the sample matrix; and
create the compressed matrix using the orthonormal matrix and the recommendation matrix.

17. The non-transitory computer-readable medium of claim 15, wherein the recommendation matrix R is an m×n matrix, wherein the instructions that, when executed by the at least one processor, cause the computer device to compress the recommendation matrix further comprise instructions that, when executed by the at least one processor, cause the computer device to:
create the random matrix as an n×k Gaussian random matrix $\Omega$, wherein k is a target number;
create an m×k sample matrix A using the Gaussian random matrix $\Omega$ and the recommendation matrix R, wherein $A=R\Omega$;
create an m×k orthonormal matrix Z using the sample matrix A, such that $A=ZX$, wherein X is a residual matrix used to bring A into the form $A=ZX$ with Z orthonormal; and
construct a k×n matrix B as compressed matrix, wherein $B=Z^T R$.

18. The non-transitory computer-readable medium of claim 15, wherein the instructions that, when executed by the at least one processor, cause the computer device to determine the values of the similarity matrix comprise instructions that, when executed by the at least one processor, cause the computer device to determine the values of the similarity matrix without using information of negative interest of users in items.

19. The non-transitory computer-readable medium of claim 15, further comprising instructions that, when executed by the at least one processor, cause the computer device to apply a rank constraint in the model to restrict dimensions of the first matrix and the second matrix.

20. The non-transitory computer-readable medium of claim 15, wherein the instructions that, when executed by the at least one processor, cause the computer device to identify the interest items for the user further comprise instructions that, when executed by the at least one processor, cause the computer device to identify a top N number of items based on the values representing the interest of the user in the individual items.

* * * * *